United States Patent
Hardesty et al.

(10) Patent No.: US 9,586,612 B2
(45) Date of Patent: Mar. 7, 2017

(54) STEERING GEAR BOX, FRONT BODY FOR VEHICLE FRAME AND METHOD

(71) Applicant: Honda Motor Co., Ltd., Minato-ku, Tokyo (JP)

(72) Inventors: Jason Hardesty, Dublin, OH (US); Rajendra Kakarla, Plain City, OH (US); Andrew Salzano, Marysville, OH (US); Toshihiro Nakamura, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/693,448

(22) Filed: Apr. 22, 2015

(65) Prior Publication Data

US 2016/0311461 A1    Oct. 27, 2016

(51) Int. Cl.
*B62D 1/19* (2006.01)
*B62D 21/15* (2006.01)

(52) U.S. Cl.
CPC ........... *B62D 1/195* (2013.01); *B62D 21/152* (2013.01)

(58) Field of Classification Search
CPC .... B62D 1/195; B62D 21/152; B62D 21/155; B60G 2206/016
See application file for complete search history.

(56) References Cited

U.S. PATENT DOCUMENTS

| | | | |
|---|---|---|---|
| 3,672,697 A | 6/1972 | Knowles | |
| 4,943,028 A | 7/1990 | Hoffmann et al. | |
| 5,482,322 A * | 1/1996 | Wheatley | B60G 3/20 180/274 |
| 5,613,709 A | 3/1997 | Nakamichi | |
| 6,397,701 B1 | 6/2002 | Park | |
| 6,425,592 B1 | 7/2002 | Lee | |
| 6,547,266 B2 | 4/2003 | Lee | |
| 7,290,778 B2 * | 11/2007 | Domin | B62D 21/11 280/785 |
| 7,320,480 B2 | 1/2008 | Maruyama et al. | |
| 7,669,688 B2 * | 3/2010 | Yamaguchi | B62D 21/152 180/232 |
| 7,740,278 B2 * | 6/2010 | Kakuta | B62D 3/12 280/777 |
| 8,226,097 B2 * | 7/2012 | Kudla | B62D 3/12 180/312 |
| 8,500,191 B1 * | 8/2013 | Baccouche | B62D 21/155 280/784 |

(Continued)

*Primary Examiner* — Paul N Dickson
*Assistant Examiner* — Timothy Wilhelm
(74) *Attorney, Agent, or Firm* — Arent Fox LLP

(57) ABSTRACT

A steering gear box for a vehicle includes a housing having a first end portion and an opposing second end portion. A first flange is coupled to the first end portion to mount a steering shaft to the housing. A front mounting leg at the first end portion outboard from the first flange defines a first aperture for receiving a fastener to couple the steering gear box to a body casting of the vehicle. The front mounting leg is configured to fail when a predetermined load is applied to the front mounting leg. A rear mounting leg at the first end portion outboard from the first flange defines a second aperture for receiving a fastener to couple the steering gear box to the body casting of the vehicle. The rear mounting leg is configured to withstand the predetermined load applied to the front mounting leg.

19 Claims, 6 Drawing Sheets

(56) References Cited

U.S. PATENT DOCUMENTS

| 9,016,424 B2* | 4/2015 | Awano | B62D 3/12 |
| | | | 180/274 |
| 9,199,662 B2* | 12/2015 | Ueno | B62D 3/12 |
| 2015/0251687 A1* | 9/2015 | Minami | B62D 3/126 |
| | | | 74/422 |

* cited by examiner coupling a steering gear box to a body casting of a vehicle frame forward of a front drive unit supported on the body casting, wherein the steering gear box is coupled to the body casting forward of a scoop defined in the body casting and the front drive unit is positioned aft of the scoop in a front region of the vehicle, the steering gear box spanning the scoop and extending laterally between a first side of the body casting and an opposite second side of the body casting

↓ configuring the steering gear box to fail during a frontal vehicular impact exceeding a predetermined load

STEERING GEAR BOX, FRONT BODY FOR VEHICLE FRAME AND METHOD

BACKGROUND

The subject matter disclosed herein relates to a steering gear box and, more particularly, the subject matter disclosed herein relates to a steering gear box and an associated vehicle frame and method for protecting occupants of the vehicle and/or a front drive unit of the vehicle from damage during a frontal vehicular impact, for example.

Some conventional vehicles include a steering gear box mounted to a front subframe coupled to a body portion of the vehicle. During a crash event, the subframe and the steering gear box detach and drop from the body portion, thereby preventing a negative effect on the deceleration of the vehicle. Controlled deceleration can increase occupant safety during crash events. However, such mounting techniques are not applicable for a vehicle having a rear mounted engine that does not include the front subframe for mounting the steering gear box.

SUMMARY

In one aspect, a steering gear box for a vehicle includes a housing having a first end portion and an opposing second end portion. A first flange is coupled to the first end portion to mount a steering shaft to the housing. A front mounting leg at the first end portion outboard from the first flange defines a first aperture for receiving a fastener to couple the steering gear box to a body casting of the vehicle. The front mounting leg is configured to fail when a predetermined load is applied to the front mounting leg. A rear mounting leg at the first end portion outboard from the first flange defines a second aperture for receiving a fastener to couple the steering gear box to the body casting of the vehicle. The rear mounting leg is configured to withstand the predetermined load applied to the front mounting leg.

In another aspect, a front body of a vehicle frame includes a body casting extending at least partially between a front end of the vehicle frame and an opposing rear end of the vehicle frame. The body casting defines a scoop in a front region of the vehicle. The body casting to support a front drive unit aft of the scoop. A steering gear box is coupled to a first portion of the vehicle frame forward of the front drive unit and spanning the scoop. The steering gear box extends laterally between a first side of the vehicle frame and an opposing second side of the vehicle frame. The steering gear box includes a housing having a first end portion and an opposing second end portion. A front mounting leg at the first end portion defines a first aperture for receiving a fastener to couple the steering gear box to the first portion of the vehicle frame at the first side of the vehicle frame forward of the scoop. The front mounting leg is configured to fail when a predetermined load is applied to the front mounting leg. A rear mounting leg at the first end portion defines a second aperture for receiving a fastener to couple the steering gear box to the first portion of the vehicle frame at the first side of the vehicle frame aft of the scoop. The rear mounting leg is configured to withstand the predetermined load applied to the front mounting leg to facilitate protecting the front drive unit from damage during a frontal vehicular impact exceeding the predetermined load.

In yet another aspect, a method includes coupling a steering gear box to a body casting of a vehicle frame forward of a front drive unit supported on the body casting. The steering gear box is coupled to the body casting forward of a scoop defined in the body casting and the front drive unit is positioned aft of the scoop in a front region of the vehicle. The steering gear box spans the scoop and extends laterally between a first side of the body casting and an opposite second side of the body casting. The method also includes configuring the steering gear box to fail during a frontal vehicular impact exceeding a predetermined load.

BRIEF DESCRIPTION OF THE DRAWINGS

FIG. 10 depicts an example method for protecting a front drive unit from damage during a frontal vehicular impact.

Other aspects and advantages of certain embodiments will become apparent upon consideration of the following detailed description, wherein similar structures have similar reference numerals.

DETAILED DESCRIPTION

Figure 1:
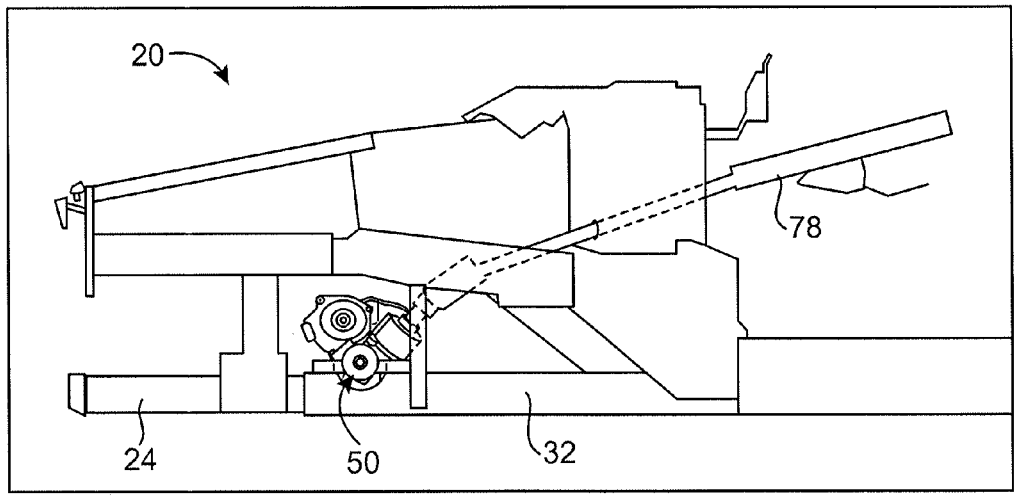
FIG. 1 is a perspective view of an example front body of a vehicle.
Figure 2:
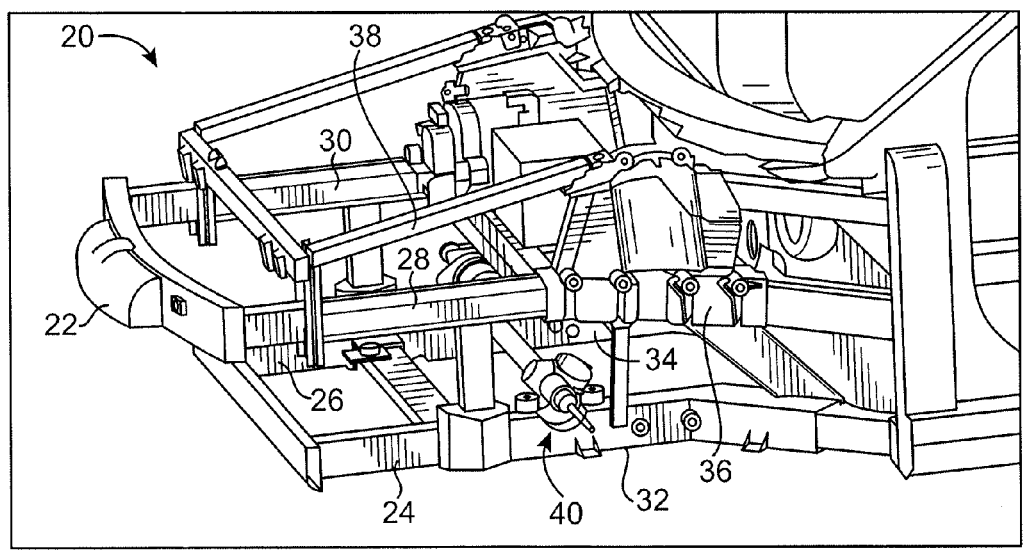
FIG. 2 is a perspective view of the example front body shown in FIG. 1.
Figure 3:
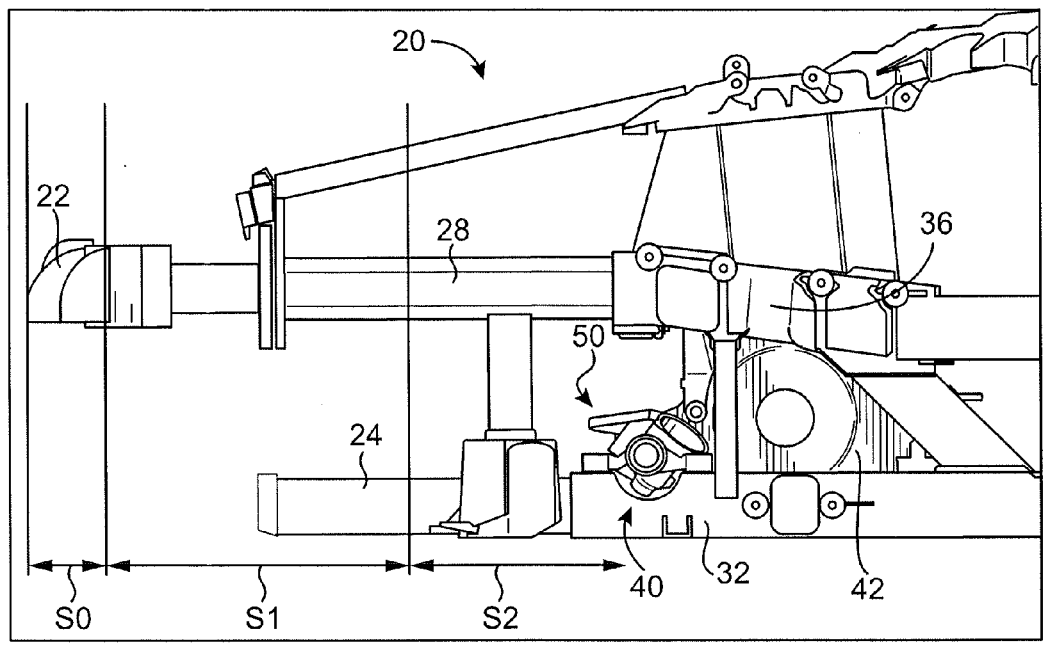
FIG. 3 is a side view of an example front body of a vehicle prior to a frontal vehicular impact.
Figure 4:
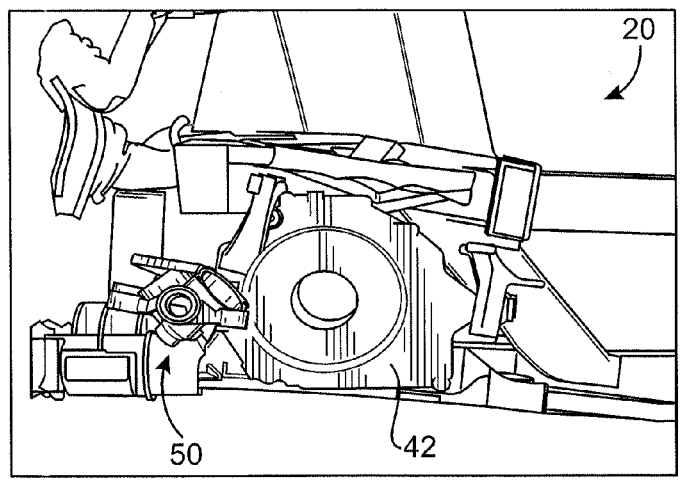
FIG. 4 is a side view of an example front body of a vehicle after a frontal vehicular impact exceeding a predetermined load.
Figure 5:
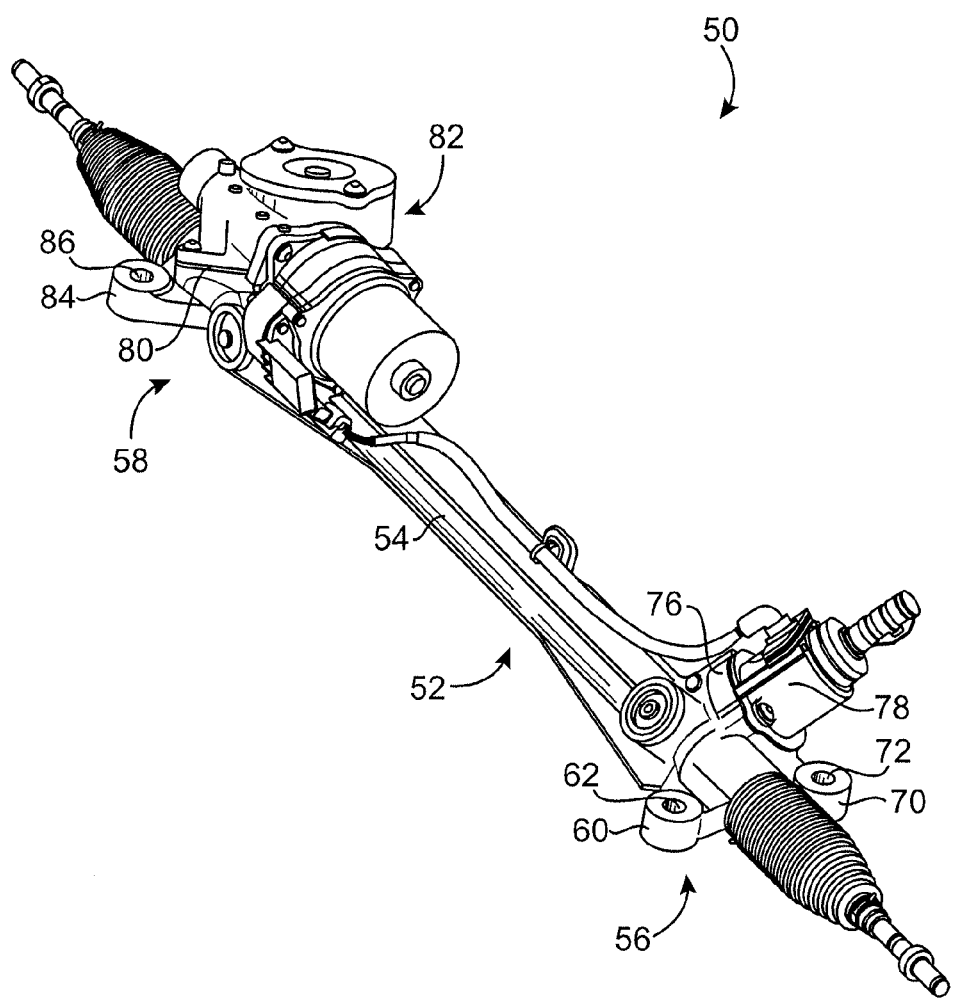
FIG. 5 is a perspective view of an example steering gear box with a steering shaft and a gear box motor coupled to a housing of the steering gear box.

In the example embodiments, a steering gear box includes a housing and integral front and rear mounting legs extending generally in opposite directions from each end of the housing. Each of the front mounting legs and the rear mounting legs is coupled to a front portion of a vehicle frame. For example, in certain embodiments each of the front mounting legs and the rear mounting legs is coupled directly to respective portions of a front body casting of the vehicle frame. In one embodiment, a body casting extends at least partially between a front end of the vehicle frame and an opposing rear end of the vehicle frame. The body casting defines one or more scoops in a front region of the vehicle, and the body casting supports a front drive unit aft of the scoop. In this embodiment, the steering gear box is coupled to the body casting forward of the front drive unit and spanning the scoop. The steering gear box extends laterally between a first side of the vehicle frame and an opposing second side of the vehicle frame.

In the example embodiments, the front mounting leg is configured to fail during a crash event when a sufficient load, referred to herein as a predetermined load, for example, a load of 40 kN+/−10 kN, is applied to the steering gear box. The rear mounting leg is configured to withstand the predetermined load and maintain attachment to the front body casting to facilitate protecting a front drive unit or a hybrid motor located within the front body casting from damage during a frontal vehicular impact exceeding the predetermined load. The failure of the front mounting leg without the failure of the corresponding rear mounting leg allows the vehicle to achieve desired deceleration targets.

In order to achieve the desired deceleration targets, in certain embodiments a total vehicle stroke target is set. To achieve the predetermined set stroke target in a lower load path, the vehicle stroke is increased with a scoop defined or formed in one or more lower members of the front body casting between an attachment location for the front mounting leg and an attachment location for the rear mounting leg of the steering gear box. To allow vehicle stroke between the front mounting leg and the rear mounting leg, the front mounting leg of the steering gear box is tuned to fail at approximately the predetermined load. For example, in certain embodiments the predetermined load is 30 kilo-Newton (kN) to 50 kN or, more specifically, in particular embodiments the predetermined load is 40 kN. The rear mounting leg is tuned to be stronger than the front mounting leg to ensure that, while the front mounting leg fails at the predetermined load, the rear mounting leg is configured to withstand the predetermined load and not fail under corresponding load conditions, for example during a frontal vehicular impact. In certain embodiments, the rear mounting leg is at least 80% stronger than the corresponding front mounting leg and, in particular embodiments the rear mounting leg is 95% stronger than the corresponding front mounting leg. In a particular embodiment, failure of one or more front mounting legs is controllable to facilitate controlling one or more of the following: vehicle stroke within the stroke target and deceleration of the vehicle during a frontal vehicular impact exceeding the predetermined load, to protect occupants of the vehicle and/or protect the front drive unit, e.g., a hybrid motor, from damage during impact, for example. Because the rear mounting leg is configured to withstand the predetermined load and not fail under corresponding load conditions, for example during a frontal vehicular impact, the continued rear mounting leg attachment to the front body casting facilitates protecting the front drive unit from damage during impact, for example.

Referring initially to FIGS. 1-4, an example front body 20 of a vehicle frame is defined by a plurality of zones. For example, in one embodiment shown in FIG. 3, a first zone S0 extends about 145 millimeters (mm) from a front end of front body 20 and includes a bumper 22. A second zone S1 adjacent the first zone extends about 355 mm and includes a driver-side lower extruded member 24, a laterally opposing passenger-side lower extruded member 26, a driver-side upper extruded member 28 and a laterally opposing passenger-side upper extruded member 30. Lower extruded members 24 and 26 and upper extruded members 28 and 30 are made of a suitable material, such as an aluminum alloy, that allows lower extruded members 24 and 26 and upper extruded members 28 and 30 to fail and axially crush during a frontal vehicular impact exceeding the predetermined load.

Adjacent the second zone, a third zone S2 extends less than 200 mm in the embodiments shown. Within the third zone, driver-side lower extruded member 24 is coupled to a corresponding driver-side lower body casting member 32 and passenger-side lower extruded member 26 is coupled to a corresponding passenger-side lower body casting member 34. Similarly, driver-side upper extruded member 28 is coupled to a corresponding driver-side upper body casting member 36 and passenger-side upper extruded member 30 is coupled to a corresponding passenger-side upper body casting member 38. In certain embodiments, each lower body casting member 32 and 34 and each upper body casting member 36 and 38 extends at least partially between a front end of the vehicle frame and an opposing rear end of the vehicle frame and is made of a suitable cast material, such as an ADC12 aluminum alloy, that can withstand the frontal vehicular impact exceeding the predetermined load and will not fail and axially crush during the frontal vehicular impact. In a particular embodiment, each of driver-side lower body casting member 32 and passenger-side lower body casting member 34 defines a scoop 40 within front body 20. In this embodiment, front body 20 supports a front drive unit 42, shown in FIGS. 3 and 4, for example, aft of scoops 40. During the frontal vehicular impact exceeding the predetermined load, each of driver-side lower body casting member 32 and passenger-side lower body casting member 34 is configured to fail, such as fracture, at respective scoop 40 to prevent or protect front drive unit 42 from damage during the frontal vehicular impact. Various battery safety legal regulations and standards including, for example, U.S. legal regulation FMVSS 305 directed to electrolyte spillage and electrical shock protection for electric powered vehicles; European legal regulations ECE-R12, ECE-R94 and ECE-R95 directed to uniform provisions concerning the approval of vehicles with regard to the protection of occupants in the event of a frontal collision; and Chinese legal regulation GB/T 19751 directed to safety specifications for hybrid electric vehicles, are in place to ensure that occupants of electric vehicles are protected during frontal collisions.

Figure 6:
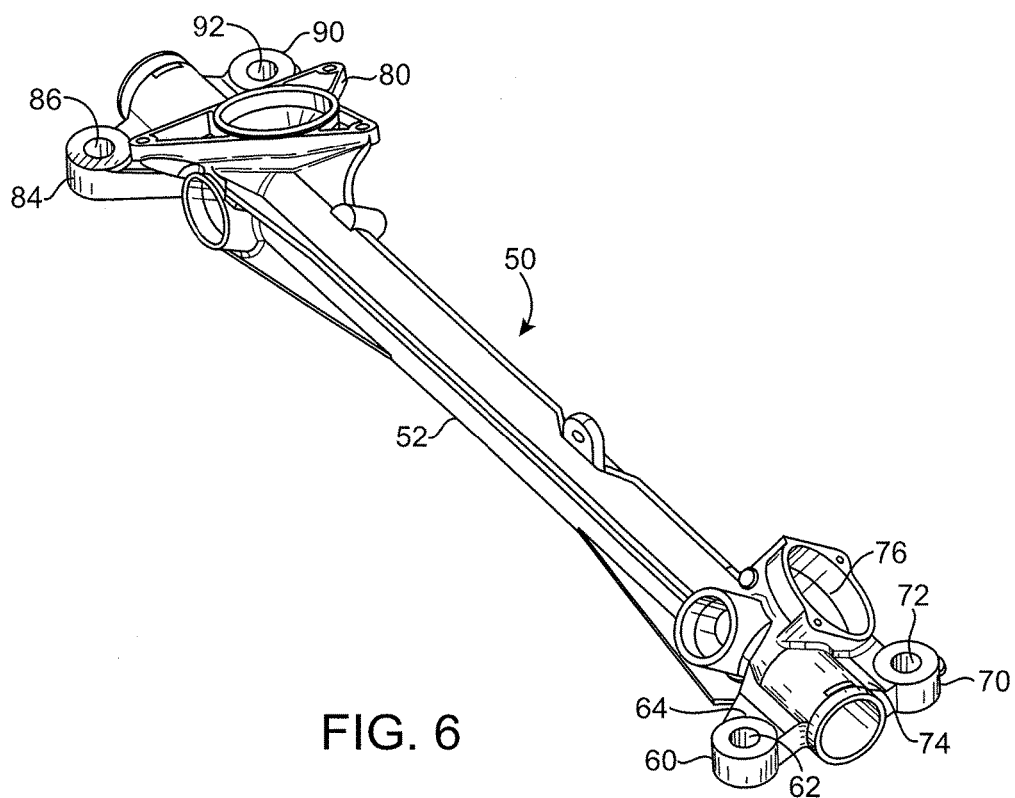
FIG. 6 is a perspective view of the steering gear box shown in FIG. 5.
Figure 7:
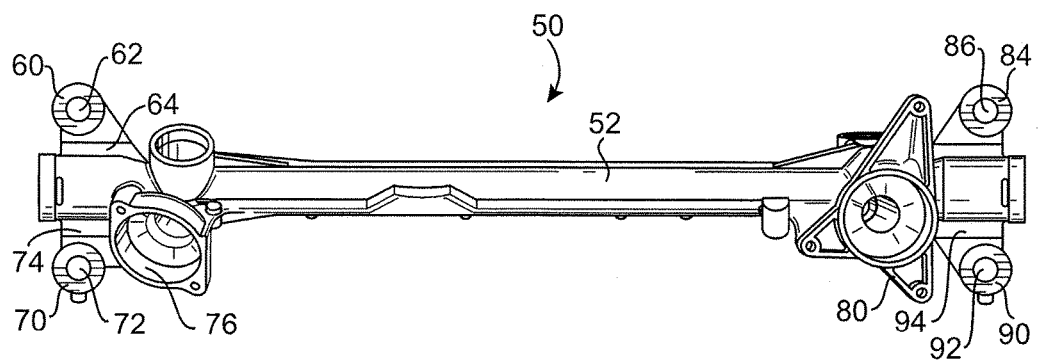
FIG. 7 is a top view of the steering gear box shown in FIG. 5.
Figure 8:
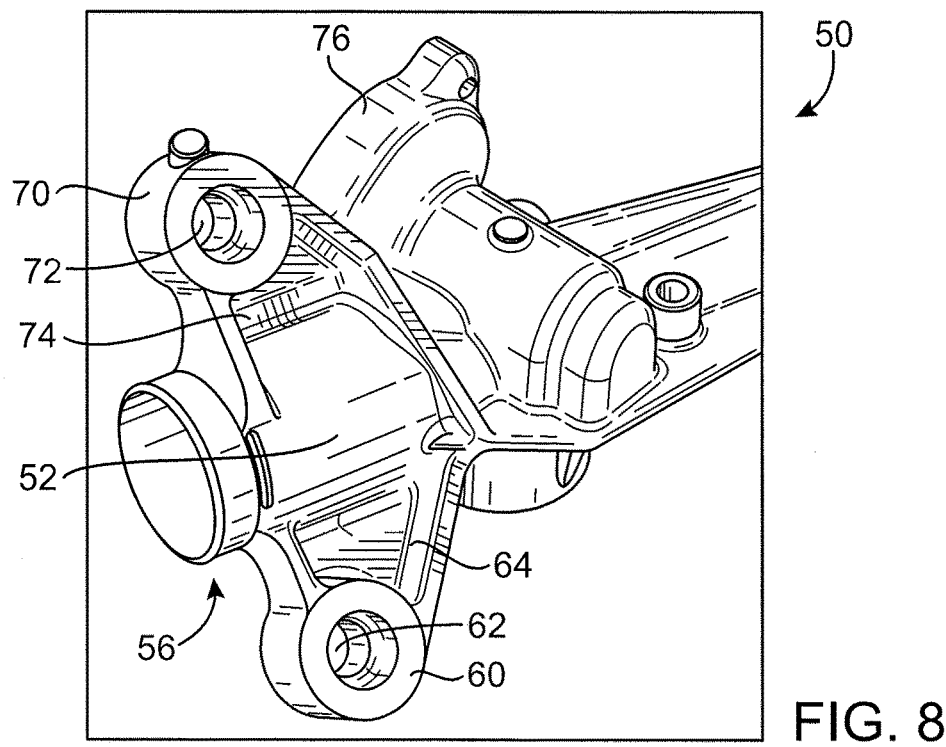
FIG. 8 is a perspective view of a first end portion of the steering gear box shown in FIG. 5.

Referring now to FIGS. 1-9, an example steering gear box 50 is coupled to the front body 20 forward of front drive unit 42 and spanning scoop 40. In one embodiment, steering gear box 50 is formed from a casting of an aluminum alloy; however, in alternative embodiments other suitable materials known to those skilled in the art may be used to form or fabricate steering gear box 50. As shown in FIGS. 1-4, in one embodiment steering gear box is coupled between driver-side lower body casting member 32 and passenger-side lower body casting member 34, to extend laterally between a first side of front body 20 and an opposing second side of front body 20. Referring further to FIGS. 5-9, steering gear box 50 includes a housing 52 having a generally cylindrical body 54 with a first end portion 56 and an opposing second end portion 58. A front mounting leg 60 at first end portion 56 defines a first aperture 62 for receiving a fastener, such as a bolt or other suitable fastening or coupling member (not shown) to couple steering gear box 50 to driver-side lower body casting member 32 forward of respective scoop 40. In certain embodiments, front mounting leg 60 is configured to fail when a predetermined load is applied to front mounting leg 60. In a particular embodiment, front mounting leg 60 includes a first bracket 64, as shown in FIG. 8 for example, positioned between front mounting leg 60 and housing 52 coupling front mounting leg 60 to housing 52. In this embodiment, first bracket 64 is configured to fracture at the predetermined load as stress on front mounting leg 60 generated as the predetermined load applied to front mounting leg 60 is concentrated in first bracket 64 resulting in failure of front mounting leg 60. In certain embodiments, the failure load of first bracket 64 is controlled by one or more of a shape of first bracket 64 and a cross-sectional configuration of first bracket 64. The shape and/or a thickness of first bracket 64, for example, can be tuned to achieve different failure loads based at least partially on the cross-sectional configuration and/or the thickness of first bracket 64. In a particular embodiment, the cross-sectional configuration and/or the thickness of first bracket 64 is such that first bracket 64 fails at 40 kN when loaded in compression.

A rear mounting leg 70 at first end portion 56 defines a second aperture 72 for receiving a fastener, such as a bolt or other suitable fastening or coupling member (not shown) to couple steering gear box 50 to driver-side lower body casting member 32 aft of respective scoop 40. In certain embodiments, with front mounting leg 60 coupled to driver-side lower body casting member 32 forward of scoop 40 and rear mounting leg 70 coupled to driver-side lower body casting member 32 aft of scoop 40, steering gear box 50 spans scoop 40 defined in driver-side lower body casting member 32.

In certain embodiments, rear mounting leg 70 is configured to withstand the predetermined load applied to front mounting leg 60 to facilitate protecting front drive unit 42 from damage during a frontal vehicular impact exceeding the predetermined load. In certain embodiments, rear mounting leg 70 is at least 80% stronger than front mounting leg 60 and, in particular embodiments, rear mounting leg 70 is 90% stronger than front mounting leg 60 and, in even more particular embodiments, rear mounting leg 70 is 95% stronger than front mounting leg 60. Initially, computer-aided engineering was used to apply a 40 kN load to a model steering gear box 50. With the 40 kN load applied to the model steering gear box 50, stress was concentrated in first bracket 64. Based on material properties, a stress that will cause the material to fail can be determined. The shape of first bracket 64 is such that with a 40 kN load, the stress in first bracket 64 is greater than the strength of the material, so failure of first bracket 64 is predictable. During testing, a model steering gear box was mounted to a crush machine and the model steering gear box was crushed to confirm that first bracket 64 began to fracture at a target load of 30 kN-50 kN. Because rear mounting leg 70 is stronger than front mounting leg 60, in a particular embodiment, rear mounting leg 70 maintains attachment to driver-side lower body casting 32 as driver-side lower body casting 32 fails, such as fractures, at respective scoop 40 during the frontal vehicular impact exceeding the predetermined load. As shown in FIG. 8 for example, rear mounting leg 70 includes a second bracket 74 positioned between rear mounting leg 70 and housing 52 coupling rear mounting leg 70 to housing 52. Second bracket 74 is configured to withstand the predetermined load.

As shown in FIGS. 5-8, for example, housing 52 includes a first flange 76 coupled to, such as integral with, first end portion 56 to mount a steering shaft 78, shown in FIG. 1, to housing 52. Front mounting leg 60 and rear mounting leg 70 are positioned at first end portion 56 outboard from first flange 76 in the embodiments shown herein. A second flange 80 is coupled to, such as integral with, second end portion 58 of steering gear box 50 to mount a gear box motor 82 shown in FIG. 5 to housing 52.

Figure 9:
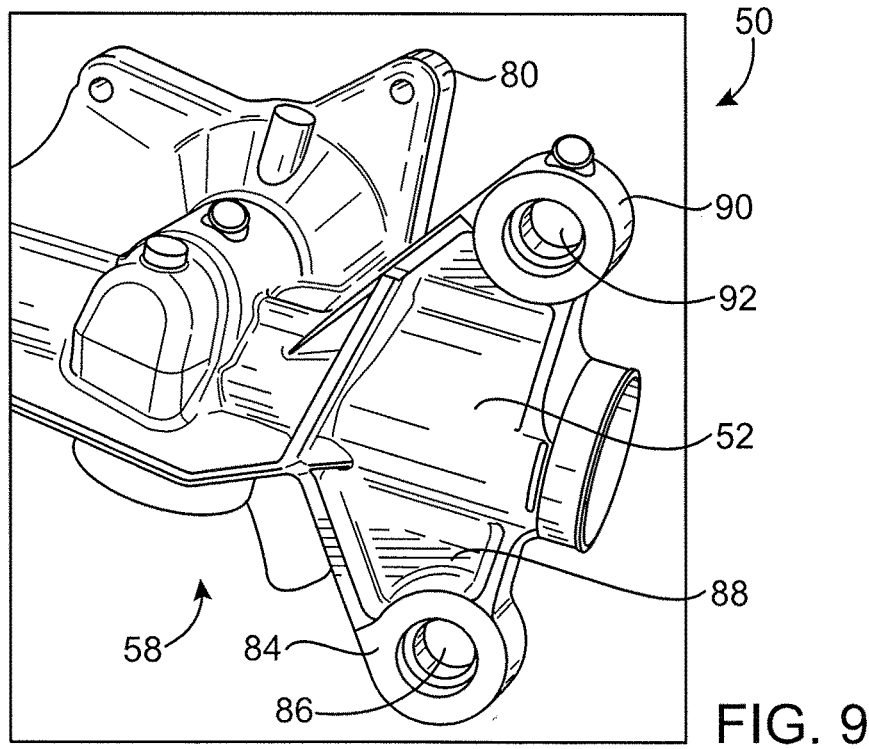
FIG. 9 is a perspective view of a second end portion of the steering gear box shown in FIG. 5.

Referring further to FIGS. 6, 7 and 9, a second front mounting leg 84 at second end portion 58 outboard from second flange 80 defines a third aperture 86 for receiving a fastener, such as a bolt or other suitable fastening or coupling member (not shown) to couple steering gear box 50 to passenger-side lower body casting member 34 of the vehicle forward of respective scoop 40. Second front mounting leg 84 is configured to fail when a second predetermined load is applied to second front mounting leg 84. In one embodiment, the second predetermined load is identical to or substantially similar to the predetermined load discussed above. For example, in certain embodiments the second predetermined load is 30 kilo-Newton (kN) to 50 kN or, more specifically, in particular embodiments the second predetermined load is 40 kN. In alternative embodiments, the second predetermined load is different than the predetermined load. In a particular embodiment, second front mounting leg 84 includes a third bracket 88 positioned between second front mounting leg 84 and housing 52 coupling second front mounting leg 84 to housing 52. In this embodiment, third bracket 88 is configured to fracture at the second predetermined load as stress on second front mounting leg 84 generated as the second predetermined load applied to second front mounting leg 84 is concentrated in third bracket 88 resulting in failure of second front mounting leg 84.

A second rear mounting leg 90 at second end portion 58 outboard from second flange 80 defines a fourth aperture 92 for receiving a fastener, such as a bolt or other suitable fastening or coupling member (not shown) to couple steering gear box 50 to passenger-side lower body casting member 34 of the vehicle aft of respective scoop 40. As shown in FIG. 9 for example, second rear mounting leg 90 includes a fourth bracket 94 positioned between second rear mounting leg 90 and housing 52 coupling second rear mounting leg 90 to housing 52. Fourth bracket 94 is configured to withstand the second predetermined load.

In this embodiment, second rear mounting leg 90 is configured to withstand the second predetermined load applied to second front mounting leg 84. In certain embodiments, with second front mounting leg 84 coupled to passenger-side lower body casting member 34 forward of scoop 40 and second rear mounting leg 90 coupled to passenger-side lower body casting member 34 aft of scoop 40, steering gear box 50 spans scoop 40 defined in passenger-side lower body casting member 34. In certain embodiments, second rear mounting leg 90 is configured to withstand the second predetermined load applied to second front mounting leg 84 to facilitate protecting front drive unit 42 from damage during a frontal vehicular impact exceeding the second predetermined load. In certain embodiments, second rear mounting leg 90 is at least 80% stronger than second front mounting leg 84 and, in particular embodiments, second rear mounting leg 90 is 90% stronger than second front mounting leg 84 and, in even more particular embodiments, second rear mounting leg 90 is 95% stronger than second front mounting leg 84. Because second rear mounting leg 90 is stronger than second front mounting leg 84, in a particular embodiment, second rear mounting leg 90 maintains attachment to passenger-side lower body casting 34 as passenger-side lower body casting 34 fails, such as fractures, at respective scoop 40 during the frontal vehicular impact exceeding the second predetermined load.

Referring to FIG. 10, an example method 100 is provided. In certain embodiments, method 100 facilitates protecting front drive unit 42 from damage during a frontal vehicular impact and/or facilitates controlling deceleration of the vehicle during a frontal vehicular impact, for example. One skilled in the art will recognize that the steering gear box, the system and the methods described herein can be combined in various ways in one or more embodiments to provide alternative or additional benefits or advantages over conventional apparatus, systems and methods.

In the embodiment shown, method 100 includes coupling 102 a steering gear box to a body casting of a front body of a vehicle frame forward of a front drive unit supported on the body casting. In one embodiment, the steering gear box is coupled to the body casting forward of a scoop defined in the body casting and the front drive unit is positioned aft of the scoop in a front region of the vehicle. The steering gear box spans the scoop and extends laterally between a first side of the front body and an opposite second side of the front body. The steering gear box is configured 104 to fail during a frontal vehicular impact exceeding a predetermined load.

As described above, in certain embodiments steering gear box 50 is configured to fail by designing the cross section and/or the thickness of each of first front mounting leg 60, e.g., the cross section and/or the thickness of first bracket 64, and second front mounting leg 84, e.g., the cross section and/or the thickness of third bracket 88, such that first front mounting leg 60 and second front mounting leg 84 will fail with a 40 kN load input. In one embodiment, configuring the steering gear box to fail during a frontal vehicular impact exceeding a predetermined load includes configuring a front mounting leg of the steering gear box coupled to the body casting forward of the scoop to fail when the predetermined load is applied to the front mounting leg and configuring a rear mounting leg of the steering gear box coupled to the body casting aft of the scoop to withstand the predetermined load applied to the front mounting leg to facilitate protecting the front drive unit from damage during the frontal vehicular impact exceeding the predetermined load. In certain embodiments, the rear mounting leg is configured to maintain attachment to the body casting as the body casting fails, such as fractures, at the scoop during the frontal vehicular impact exceeding the predetermined load.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments. As used herein, the word "exemplary" means serving as an example, instance, or illustration. Any aspect or embodiment described herein as "exemplary" is not necessarily to be construed as preferred or advantageous over other aspects or embodiments.

What is claimed is:

1. A steering gear box for a vehicle, the steering gear box comprising:
    a housing having a first end portion and an opposing second end portion;
    a first flange coupled to the first end portion to mount a steering shaft to the housing;
    a front mounting leg at the first end portion outboard from the first flange, the front mounting leg defining a first aperture for receiving a fastener to couple the steering gear box to a body casting of the vehicle, the front mounting leg configured to fail when a predetermined load is applied to the front mounting leg; and
    a rear mounting leg at the first end portion outboard from the first flange, the rear mounting leg defining a second aperture for receiving a fastener to couple the steering gear box to the body casting of the vehicle, the rear mounting leg configured to withstand the predetermined load applied to the front mounting leg.

2. The steering gear box according to claim 1, wherein the front mounting leg further comprises a first bracket coupling the front mounting leg to the housing, the first bracket configured to fracture at the predetermined load.

3. The steering gear box according to claim 2, wherein the rear mounting leg further comprises a second bracket coupling the rear mounting leg to the housing, the second bracket configured to withstand the predetermined load.

4. The steering gear box according to claim 2, wherein stress on the front mounting leg generated as the predetermined load is applied to the front mounting leg is concentrated in the first bracket.

5. The steering gear box according to claim 1, wherein the rear mounting leg remains coupled to the body casting as the front mounting leg fails when the predetermined load is applied to the front mounting leg.

6. The steering gear box according to claim 1, wherein the steering gear box spans a scoop defined in the body casting, and the front mounting leg is coupled to the body casting forward of the scoop and the rear mounting leg is coupled to the body casting aft of the scoop.

7. The steering gear box according to claim 1, wherein the rear mounting leg is at least 80% stronger than the front mounting leg.

8. The steering gear box according to claim 1, further comprising:
    a second flange coupled to the second end portion to mount a gear box motor to the housing;
    a second front mounting leg at the second end portion outboard from the second flange, the second front mounting leg defining a third aperture for receiving a fastener to couple the steering gear box to the body casting of the vehicle, the second front mounting leg configured to fail when a second predetermined load is applied to the second front mounting leg; and
    a second rear mounting leg at the second end portion outboard from the second flange, the second rear mounting leg defining a fourth aperture for receiving a fastener to couple the steering gear box to the body casting of the vehicle, the second rear mounting leg configured to withstand the second predetermined load applied to the second front mounting leg.

9. The steering gear box according to claim 8, wherein the second predetermined load is different than the predetermined load.

10. The steering gear box according to claim 1, wherein the steering gear box is formed from a casting of an aluminum alloy.

11. The steering gear box according to claim 1, wherein the predetermined load is 30 kilo-Newton (kN) to 50 kN.

12. A front body of a vehicle frame comprising:
a body casting extending at least partially between a front end of the vehicle frame and an opposing rear end of the vehicle frame, the body casting defining a scoop in a front region of the vehicle, and the body casting to support a front drive unit aft of the scoop; and
a steering gear box coupled to a first portion of the vehicle frame forward of the front drive unit and spanning the scoop, the steering gear box extending laterally between a first side of the vehicle frame and an opposing second side of the vehicle frame, the steering gear box comprising:
a housing having a first end portion and an opposing second end portion;
a front mounting leg at the first end portion, the front mounting leg defining a first aperture for receiving a fastener to couple the steering gear box to the first portion of the vehicle frame at the first side of the vehicle frame forward of the scoop, the front mounting leg configured to fail when a predetermined load is applied to the front mounting leg; and
a rear mounting leg at the first end portion, the rear mounting leg defining a second aperture for receiving a fastener to couple the steering gear box to the first portion of the vehicle frame at the first side of the vehicle frame aft of the scoop, the rear mounting leg configured to withstand the predetermined load applied to the front mounting leg to facilitate protecting the front drive unit from damage during a frontal vehicular impact exceeding the predetermined load.

13. The front body of a vehicle frame according to claim 12, further comprising a first flange coupled to the first end portion to mount a steering shaft to the housing.

14. The front body of a vehicle frame according to claim 12, wherein the front mounting leg further comprises a first bracket coupling the front mounting leg to the housing, the first bracket configured to fracture at the predetermined load.

15. The front body of a vehicle frame according to claim 12, wherein the rear mounting leg maintains attachment to the first portion of the vehicle frame as the body casting fails at the scoop during the frontal vehicular impact exceeding the predetermined load.

16. The front body of a vehicle frame according to claim 12, wherein the first portion of the vehicle frame comprises the body casting.

17. A method, comprising:
coupling a steering gear box to a body casting of a vehicle frame forward of a front drive unit supported on the body casting, wherein the steering gear box is coupled to the body casting forward of a scoop defined in the body casting and the front drive unit is positioned aft of the scoop in a front region of the vehicle, the steering gear box spanning the scoop and extending laterally between a first side of the body casting and an opposite second side of the body casting; and
configuring the steering gear box to fail during a frontal vehicular impact exceeding a predetermined load, comprising:
configuring a front mounting leg of the steering gear box coupled to the body casting forward of the scoop to fail when the predetermined load is applied to the front mounting leg, and
configuring a rear mounting leg of the steering gear box coupled to the body casting aft of the scoop to withstand the predetermined load applied to the front mounting leg to facilitate protecting the front drive unit from damage during the frontal vehicular impact exceeding the predetermined load.

18. The method according to claim 17, further comprising configuring the rear mounting leg to maintain attachment to the body casting as the body casting fails at the scoop during the frontal vehicular impact exceeding the predetermined load.

19. The method according to claim 17, wherein configuring a front mounting leg of the steering gear box coupled to the body casting forward of the scoop to fail when the predetermined load is applied to the front mounting leg comprises controlling a failure of one or more front mounting legs to facilitate controlling one or more of the following: vehicle stroke within a stroke target and deceleration of the vehicle during a frontal vehicular impact exceeding the predetermined load.

* * * * *